United States Patent
Bana

(10) Patent No.: US 12,335,835 B2
(45) Date of Patent: Jun. 17, 2025

(54) TELECOMMUNICATIONS METHOD AND SYSTEM

(71) Applicant: Hafeez Bana, London (GB)

(72) Inventor: Hafeez Bana, London (GB)

( * ) Notice: Subject to any disclaimer, the term of this patent is extended or adjusted under 35 U.S.C. 154(b) by 355 days.

(21) Appl. No.: 16/326,497

(22) PCT Filed: Aug. 18, 2017

(86) PCT No.: PCT/GB2017/052459
§ 371 (c)(1),
(2) Date: Feb. 19, 2019

(87) PCT Pub. No.: WO2018/033756
PCT Pub. Date: Feb. 22, 2018

(65) Prior Publication Data
US 2021/0185586 A1    Jun. 17, 2021

(30) Foreign Application Priority Data
Aug. 18, 2016    (GB) ...................................... 1614168

(51) Int. Cl.
*H04W 40/02* (2009.01)
*H04W 4/60* (2018.01)
*H04W 8/02* (2009.01)
*H04W 8/18* (2009.01)

(52) U.S. Cl.
CPC ............ *H04W 40/02* (2013.01); *H04W 4/60* (2018.02); *H04W 8/02* (2013.01); *H04W 8/183* (2013.01)

(58) Field of Classification Search
CPC ....... H04W 40/02; H04W 8/02; H04W 8/183; H04W 4/20
See application file for complete search history.

(56) References Cited

U.S. PATENT DOCUMENTS

| | | | |
|---|---|---|---|
| 2006/0046752 A1 | 3/2006 | Kalavade | |
| 2008/0267199 A1* | 10/2008 | Smith .................. | H04W 88/16 370/401 |
| 2011/0143754 A1* | 6/2011 | Jiang ...................... | H04W 4/24 455/432.1 |
| 2013/0065557 A1* | 3/2013 | Zhang ................... | H04W 12/04 455/411 |
| 2014/0057600 A1* | 2/2014 | Dung ...................... | H04W 8/02 455/411 |

(Continued)

FOREIGN PATENT DOCUMENTS

| | | |
|---|---|---|
| EP | 2 658 301 | 10/2013 |
| GB | 2 427 793 | 1/2007 |

(Continued)

OTHER PUBLICATIONS

International Search Report for PCT/GB2017/052459 dated Nov. 16, 2017, 3 pages.

*Primary Examiner* — San Htun
(74) *Attorney, Agent, or Firm* — Nixon & Vanderhye, P.C.

(57) ABSTRACT

The present invention relates to a method for routing communications within a telecommunications network. The method includes, within a server system, routing a telecommunications message for a telephony subscriber identity to a simulated subscriber identity module and performing an action in relation to the telecommunications message at the simulated subscriber identity module. A server system is also disclosed.

28 Claims, 12 Drawing Sheets

(56) References Cited

U.S. PATENT DOCUMENTS

| | | | | |
|---|---|---|---|---|
| 2014/0220952 A1* | 8/2014 | Holtmanns | ............. | H04W 4/50 |
| | | | | 455/418 |
| 2015/0063166 A1* | 3/2015 | Sif | ...................... | G06F 9/45558 |
| | | | | 370/254 |
| 2015/0257044 A1* | 9/2015 | Jiang | ..................... | H04W 8/065 |
| | | | | 455/433 |
| 2016/0183178 A1* | 6/2016 | Marimuthu | ........... | H04W 8/183 |
| | | | | 455/432.1 |
| 2016/0330784 A1* | 11/2016 | Liu | ......................... | H04W 4/00 |
| 2018/0054527 A1* | 2/2018 | Zhao | .................. | H04M 7/0075 |

FOREIGN PATENT DOCUMENTS

| WO | 2006/085295 | 8/2006 |
|---|---|---|
| WO | 2006/094564 | 9/2006 |
| WO | 2014/122588 | 8/2014 |

* cited by examiner

TELECOMMUNICATIONS METHOD AND SYSTEM

This application is the U.S. national phase of International Application No. PCT/GB2017/052459 filed Aug. 18, 2017 which designated the U.S. and claims priority to GB 1614168.1 filed Aug. 18, 2016, the entire contents of each of which are hereby incorporated by reference.

FIELD OF INVENTION

The present invention is in the field of telecommunications. More particularly, but not exclusively, the present invention relates to routing communications within a telecommunications network.

BACKGROUND

In general, subscribers to a telecommunications network are provided with telecommunications services, such as connecting calls from their telephony device to other telephony devices, via the public switched telephone network (PSTN). The PSTN is the aggregate of the world's circuit-switched telephone networks that are operated by national, regional, or local telephony operators. To interact with the PSTN, a telephony device for a subscriber initiates communication with another telephony device or other end point, typically, via a telephone number for the other telephony device or other end point.

The PTSN includes a number of core networks which are capable of transmitting telecommunications messages between one another using a backbone communications infrastructure.

Subscribers receive subscriber identities which are unique within the telecommunications network. One type of identity for a mobile subscriber is an IMSI (International Mobile Subscriber Identity). Communications can be routed within and between core networks within the telecommunications network to a subscriber's mobile telephony device via their IMSI. Subscriber mobile telephony devices include a subscriber identity module (SIM) which includes their IMSI. When the mobile telephony device is powered on, it attempts to connect to a core network via a base transceiver station (BTS) within the radio area network (RAN). Within the GSM standard, the core network will then register that device's IMSI within its home location register (HLR) for subscribers of that core network or visitor location register (VLR) for subscribers to other core networks. Communications then originating within that core network or another can then be routed to the correct BTS for transmission to the mobile telephony device.

It would be desirable if additional functionality could be easily and/or flexibly added to a telecommunications network.

One mechanism for providing additional functionality to a telecommunications network is the use of a SIM Gateway, Box, or Bank. A SIM Gateway is a collection of physical SIM cards within an apparatus. Calls to a telephony subscriber identity are routed by the core network to the radio network and then to the apparatus via a wireless communications module at the apparatus. The apparatus may then re-route the calls to another destination (typically over an IP network). However, this mechanism has several drawbacks: firstly, a separate physical SIM card is required for each subscriber identity; secondly, telecommunications messages must be received at the apparatus via the radio network which can lead to congestion at the local cellular tower, and thirdly, the provision of SIM banks is illegal in many countries.

It is an object of the present invention to provide a telecommunications method and system which overcomes the disadvantages of the prior art, or at least provides a useful alternative.

SUMMARY OF INVENTION

According to a first aspect of the invention there is provided a method for routing communications within a telecommunications network, including: within a server system:

routing a telecommunications message for a telephony subscriber identity to a simulated subscriber identity module; and performing an action in relation to the telecommunications message at the simulated subscriber identity module.

The action may be a communications action.

The simulated subscriber identity module may be associated with the first telephony subscriber identity.

The first telephony subscriber identity may be a unique identifier within the telecommunications network. The first telephony subscriber identity may be one of an IMSI, MS-ISDN, GUTI, IMPI, IMPU, or GRUU.

The telecommunications message may be a GSM, UMTS, LTE, or VoLTE message.

The method may further include receiving the telecommunications message at the server system from a core network of a mobile network operator. The telecommunications message may be received via a signalling interface. The signalling interface may receive the telecommunications message via the SS7 protocol.

The server system may include a roaming network.

The server system may simulate, at least in part, a roaming network. The server system may simulate, at least, a VLR and a MSC of the roaming network. The server system may simulate, at least, a MME and a CSCF.

The simulated subscriber identity module may simulate telecommunications messaging flows.

The simulated subscriber identity module may store state.

The method may further include provision of an application programming interface (API) for access to the simulated subscriber identity module. The API may be externally exposed and/or may be exposed via IP (Internet Protocol).

The telecommunications message may be routed to the simulated subscriber identity module when a physical subscriber identity module associated with the first telephony subscriber identity is not detected within the telecommunications network.

The telecommunications message may be routed to the simulated subscriber identity module when a configuration message is received by the server system from a user of the first telephony subscriber identity.

The method may further include routing a second telecommunications message to a physical subscriber identity module when the physical subscriber identity module associated with the first telephony subscriber identity is detected within the telecommunications network.

The action may include routing of communications routed to the first telephony subscriber identity to a second telephony subscriber identity. The second telephony subscriber identity may be associated with a physical subscriber identity module. The first and second subscriber identity may be both associated with the same subscriber.

The telecommunications message may be routed to the first telephony subscriber identity from a third telephony subscriber identity associated with a physical subscriber identity module. The first and third subscriber identity may be both associated with the same subscriber.

The second telephone subscriber identity may have a home network and the home network may be the roaming network.

The third telephone subscriber identity may have a home network and the home network may be the roaming network.

The second subscriber identity and the third subscriber identity may be the same identity.

According to a further aspect of the invention there is provided a system for routing communications within a telecommunications network, including: one or more processors configured for providing a signalling gateway and a core component; wherein the signalling gateway is configured for routing a telecommunications message for a first telephony subscriber identity to a simulated subscriber identity module and the core component is configured for performing an action in relation to the telecommunications message at the simulated subscriber identity module.

According to a further aspect of the invention there is provided a telecommunications network, including:

A system as claimed in the aspect above; and

One or more core networks.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides a method and server system for routing communications within a telecommunications network.

The inventor has discovered that a subscriber identity module can be simulated within a telecommunications network. Standard telecommunications messages for a subscriber identity can then be routed to the simulated module. This may provide flexibility and extensibility for actions to be performed in relation to those telecommunications messages such as re-routing the messages to different subscriber identities, providing an API to the simulated module for use by third parties, and simulating physical phone functions.

Figure 1:
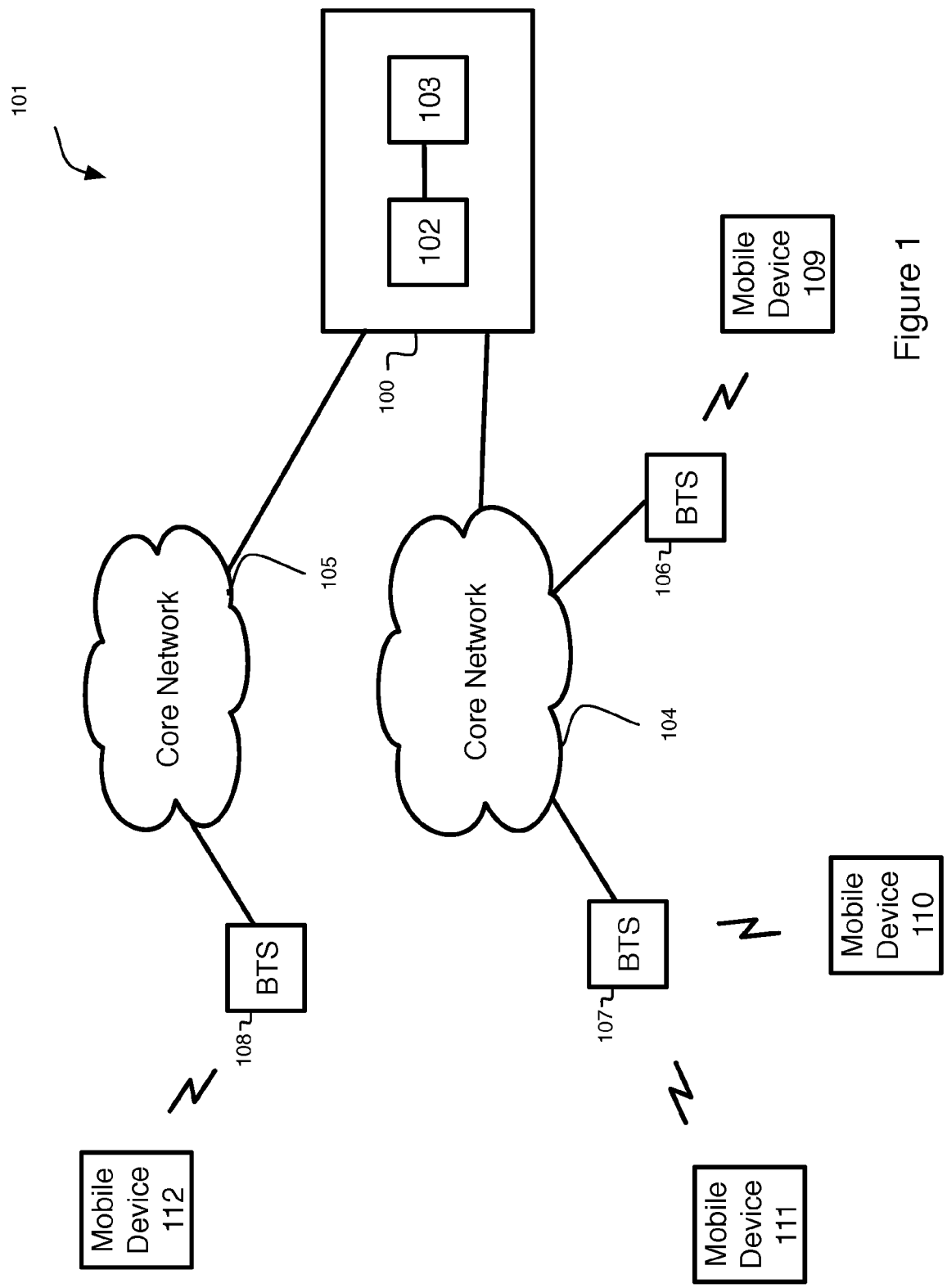
FIG. 1: shows a block diagram illustrating a server system within a telecommunications network in accordance with an embodiment of the invention.

In FIG. 1, a server system 100 within a telecommunications network 101 in accordance with an embodiment of the invention is shown.

The telecommunications network may be a mobile telecommunications network based upon GSM standards, based upon LTE standards, or based upon any other mobile telecommunications standard.

The server system 100 includes one or more processors 102 and one or more communication apparatuses 103.

A plurality of core networks 104 and 105 are shown. The server system 100 may be connected to one or more of the core networks 104 and/or 105 via an inter-network signalling protocol such as SS7 (for example, for GSM). SIGTRAN may be used to establish the connections between the server system 100 and the one or more core networks 104 and/or 105. It will be appreciated that different signalling protocols may be used for different mobile communications standards such as LTE.

Each of core networks 104 and 105 may comprise one or more base transceiver stations (BTSes) such as 106, 107, and 108 within a radio area network (RAN). Mobile telephony devices 109, 110, 111 and 112 with subscriber identity modules (SIMs) may transmit and receive communications via the BTSes 106, 107, and/or 108 and core networks 104 and/or 105.

The one or more processors 102 at the server system 100 may be configured to execute instructions to route telecommunications messages for a telephony subscriber identity to a simulated subscriber identity module, and perform an action in relation to the telecommunications message at the simulated subscriber identity module. Telecommunications messages may be received from the one or more core networks 104 and/or 105 via the one or more communications apparatuses 103.

The one or more processors 102 at the server system 100 may be configured to execute instructions to route telecommunications messages from a simulated subscriber identity module for a telephony subscriber identity. Telecommunications messages may be transmitted to the one or more core networks 104 and/or 105 via the one or more communications apparatuses 103.

The one or more processors 102 may be further configured to provide the simulated subscriber identity module.

The telecommunications messages may include MAP (Mobile Application Part), CAMEL (Customized Applications for Mobile networks Enhanced Logic), and/or BICC (Bearer-Independent Call Control).

Figure 2:
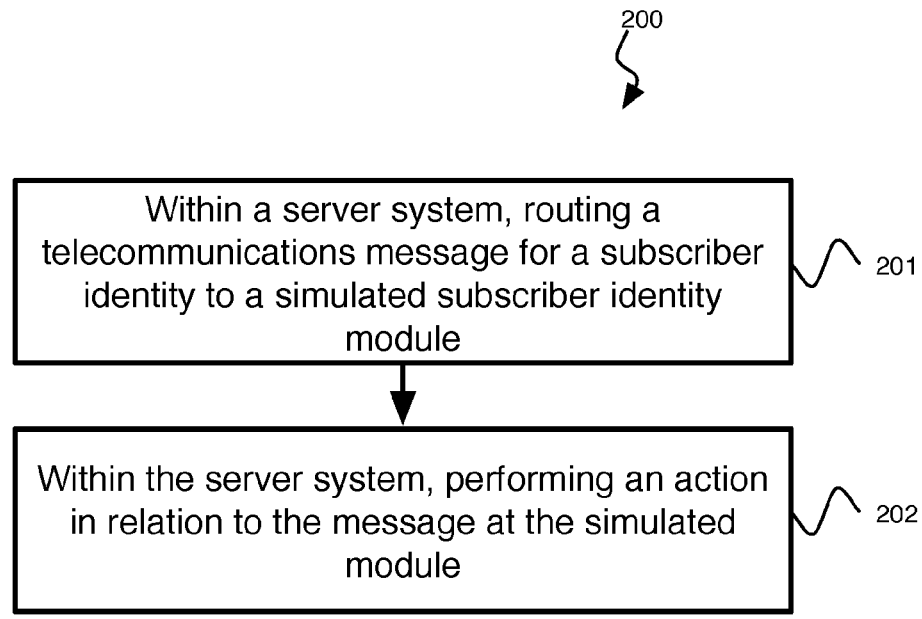
FIG. 2: shows a flow diagram illustrating a method for routing communications within a telecommunications network in accordance with an embodiment of the invention.

Referring to FIG. 2, a method 200 for routing communications within a telecommunications network (e.g. 101) comprising a server system (e.g. 100) in accordance with an embodiment of the invention will be described.

The server system (e.g. 100) may comprise a core component and signalling gateway further described in relation to FIG. 3 below.

In step 201, the server system routes a telecommunications message for a telephony subscriber identity to a simulated subscriber identity module. The server system may receive the telecommunications message (which may be, in embodiments, a GSM (Global System for Mobile), UMTS (Universal Mobile Telecommunications System), LTE (Long-Term Evolution), or VoLTE (Voice over LTE) message) from a core network (e.g. 104 or 105) within a mobile network operator. The message may be received via a signalling gateway within the server system. The signalling gateway may receive the message via an inter-network signalling protocol such as SS7. The server system may be a roaming network or may be simulating a roaming network to the core network. The server system may simulate functions of a roaming network such as a VLR (Visitor Location Register) and MSC (Mobile Switching Centre) or MME (Mobility Management Entity) and CSCF (Call Session Control Function).

The signalling gateway may simulate telecommunications messaging flows, and the telecommunications messages routed to the simulated subscriber identity module may be translated or transformed by the signalling gateway.

The server system may route telecommunications messages to the simulated subscriber identity module in dependence on whether a physical subscriber identity module exists within the telecommunications network or when configured by the subscriber.

In step 202, the server system performs an action in relation to the telecommunications message at the simulated subscribed identity module.

The server system may further provide an application programming interface (API) to the simulated subscriber identity module. This API may be accessible to third party providers to enable one or more actions to be performed in relation to the telecommunication message to be defined. The API may be exposed via remote procedure calls (RPC) through, for example, a graphQL, Erlang RPC, or a RESTful (REpresentational State Transfer) web service. The API may be exposed via Internet Protocol (IP).

Figure 3:
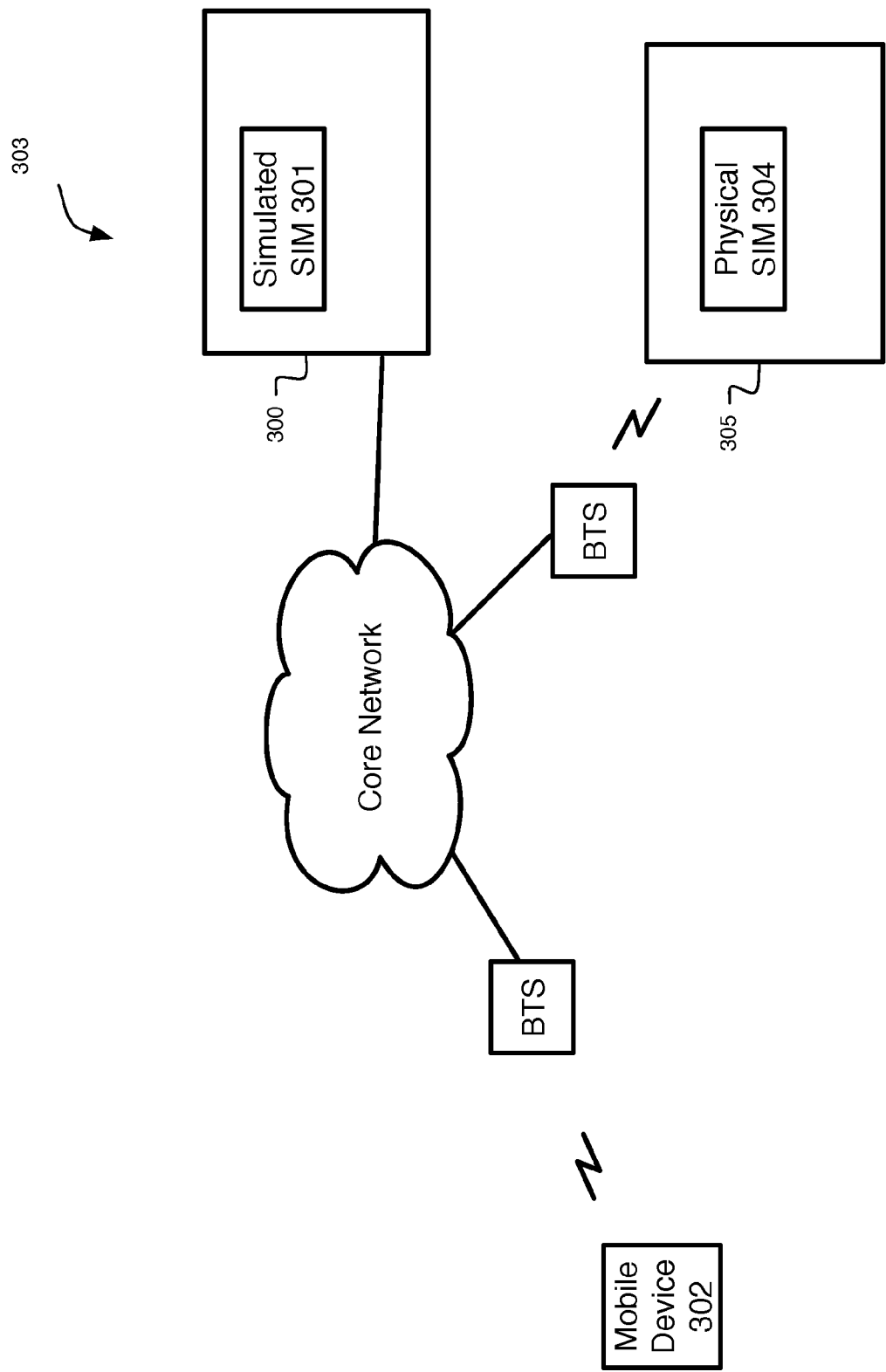
FIG. 3: shows a block diagram illustrating a server system within a telecommunications network in accordance with an embodiment of the invention.

In embodiments, described in relation to FIG. 3, the action that may be provided by the 300 server system is the routing of communications routed to the telephony subscriber identity (e.g. an IMSI associated with simulated SIM 301), for example, from mobile device 302, to another telephony subscriber identity. For example, voice, SMS (Short Message Service), or USSD (Unstructured Supplementary Service Data) communications routed to the telephony subscriber identity (e.g. the IMSI associated with 301) by the telecommunications network 303 could be re-routed by the server system 300 through the telecommunications network 303 to another telephony subscriber identity. This identity may be associated with a physical subscriber identity module (e.g. physical SIM 304 within mobile device 305). The first and second subscriber identity may belong to the same subscriber. Therefore, it will be appreciated that a subscriber may receive telephone calls (or other communications), for example, made to a telephone number for their first telephony subscriber identity (e.g. the IMSI associated with 301) at a telephone number for their second telephony subscriber identity (e.g. the IMSI associated with 304) at their device 305.

Figure 4:
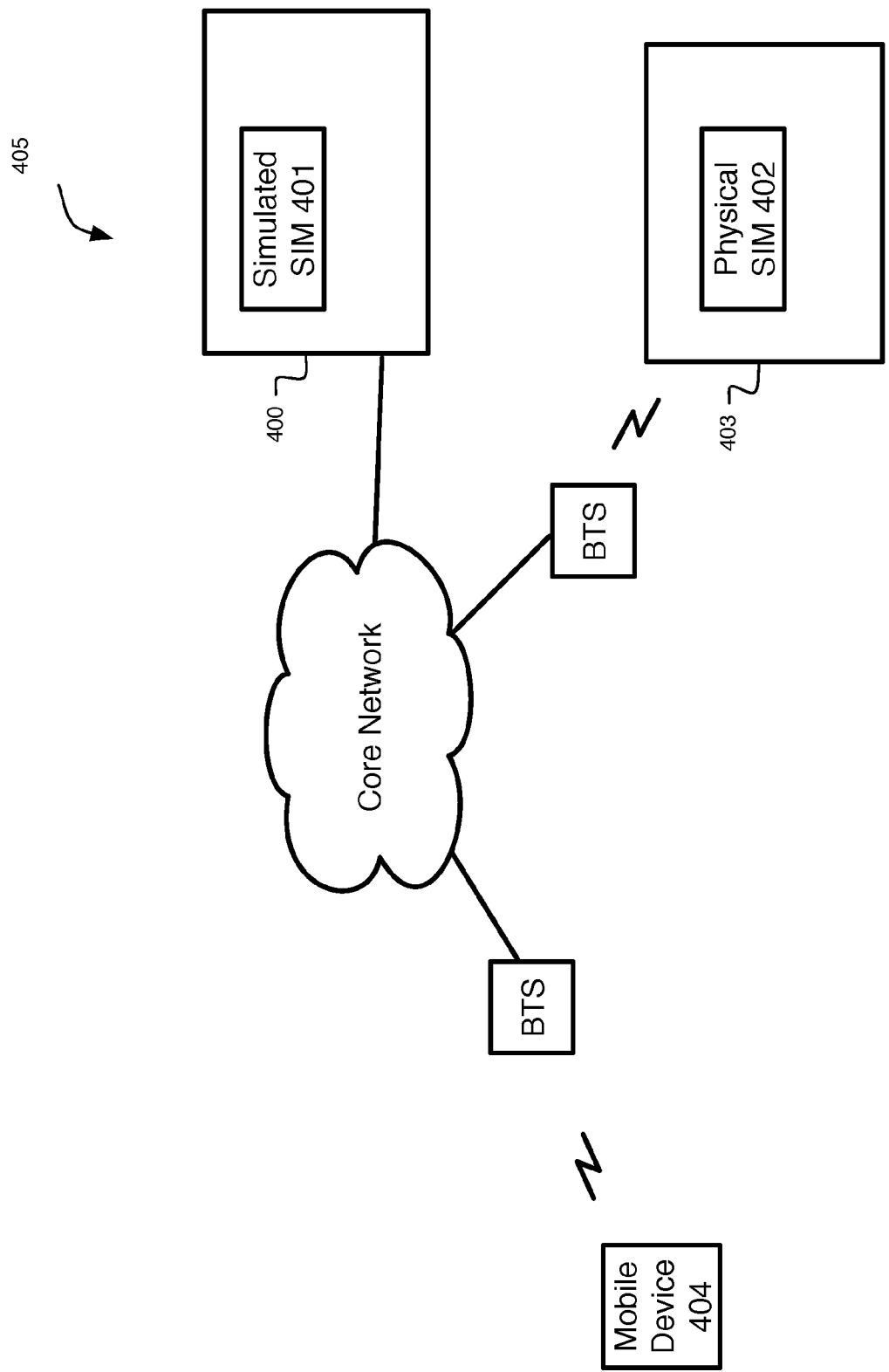
FIG. 4: shows a block diagram illustrating a server system within a telecommunications network in accordance with an embodiment of the invention.

In embodiments, described in relation to FIG. 4, telecommunications messages routed by the server system 400 to the telephony subscriber identity (e.g. an IMSI associated with simulated SIM 401) may originate from a third telephony subscriber identity associated with a physical subscriber identity module 402. That module 402 may be deployed within a telephony user device 403. The first and third telephony subscriber identity may belong to the same subscriber. Therefore, it will be appreciated that a subscriber may initiate a telephone call (or generate another communications message) at that device 403 and have the calls (or communications) routed through the simulated subscriber identity module 401 to other end-points (e.g. mobile device 404) within the telecommunications network 405 or otherwise managed at the simulated identity module 401.

Figure 5:
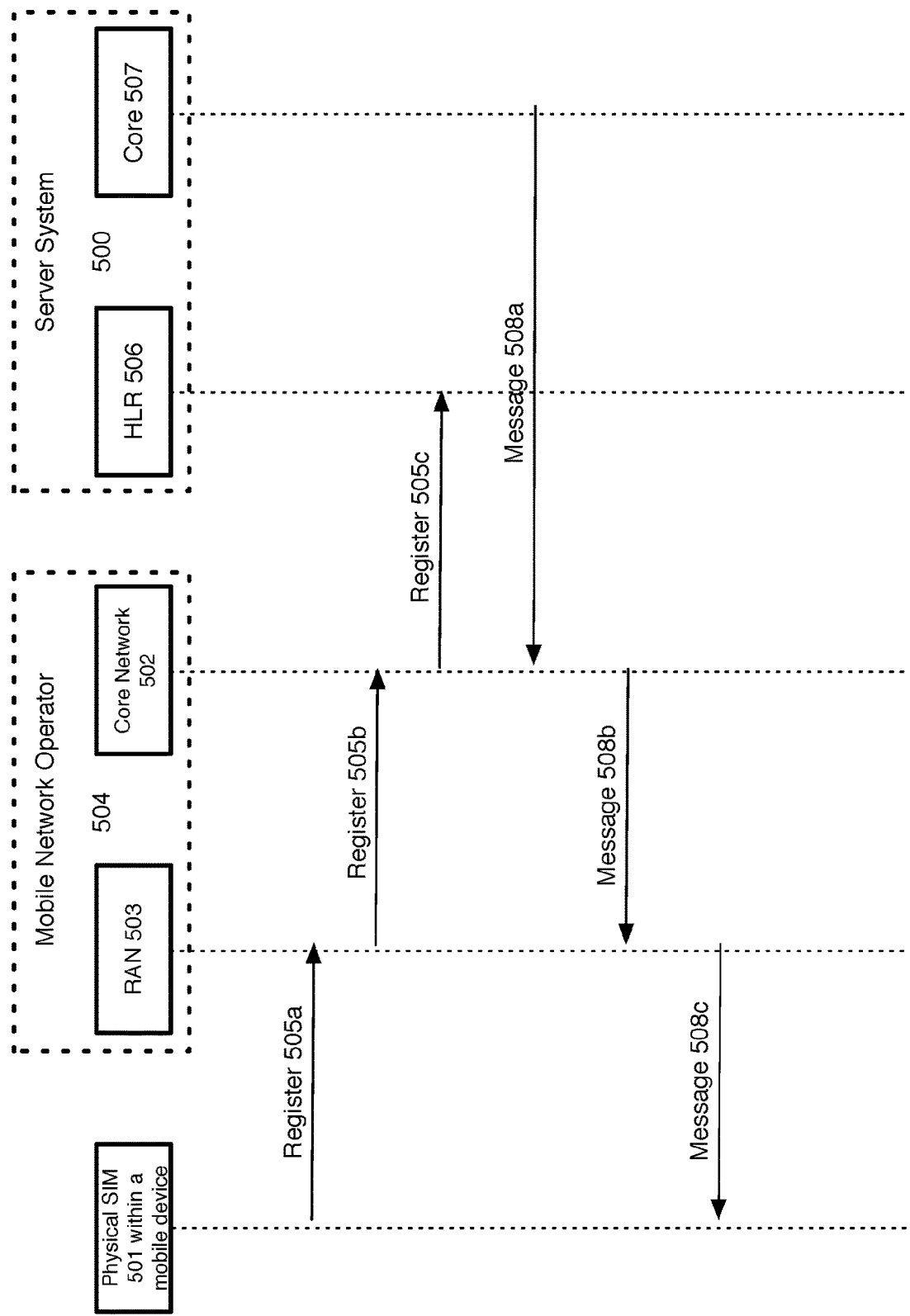
FIG. 5: shows a sequence diagram illustrating a method for routing communications within a telecommunications network in accordance with an embodiment of the invention.

In embodiments, described in relation to FIG. 5, the second and/or third subscriber identities may have their home network at the server system 500 when the server system 500 is, or is simulating, a roaming network. In this way, when the physical subscriber identity modules 501 associated with these identities are registered at a core network 502 (for example, via a RAN 503 of a mobile network operator 504), the registration telecommunications messages 505a/b/c will be routed to the server system 500 (e.g. the server system 500 may simulate a HLR 506 to receive the routed telecommunications messages). The operator of the core network 502 may set up an arrangement with the operator of the server system 500 to treat the second and/or third identities as in-network identities for the purposes of billing but, it can be seen, can augment the functionality of their core network 502 using the server system without modifying their core network. The core component 507 of the server system 500 may then be routed messages or communications for the SIM 501 and/or route messages or communications (e.g. 508a/b/c) to the mobile device associated with the SIM 501 via the MNO 504.

Figure 6:
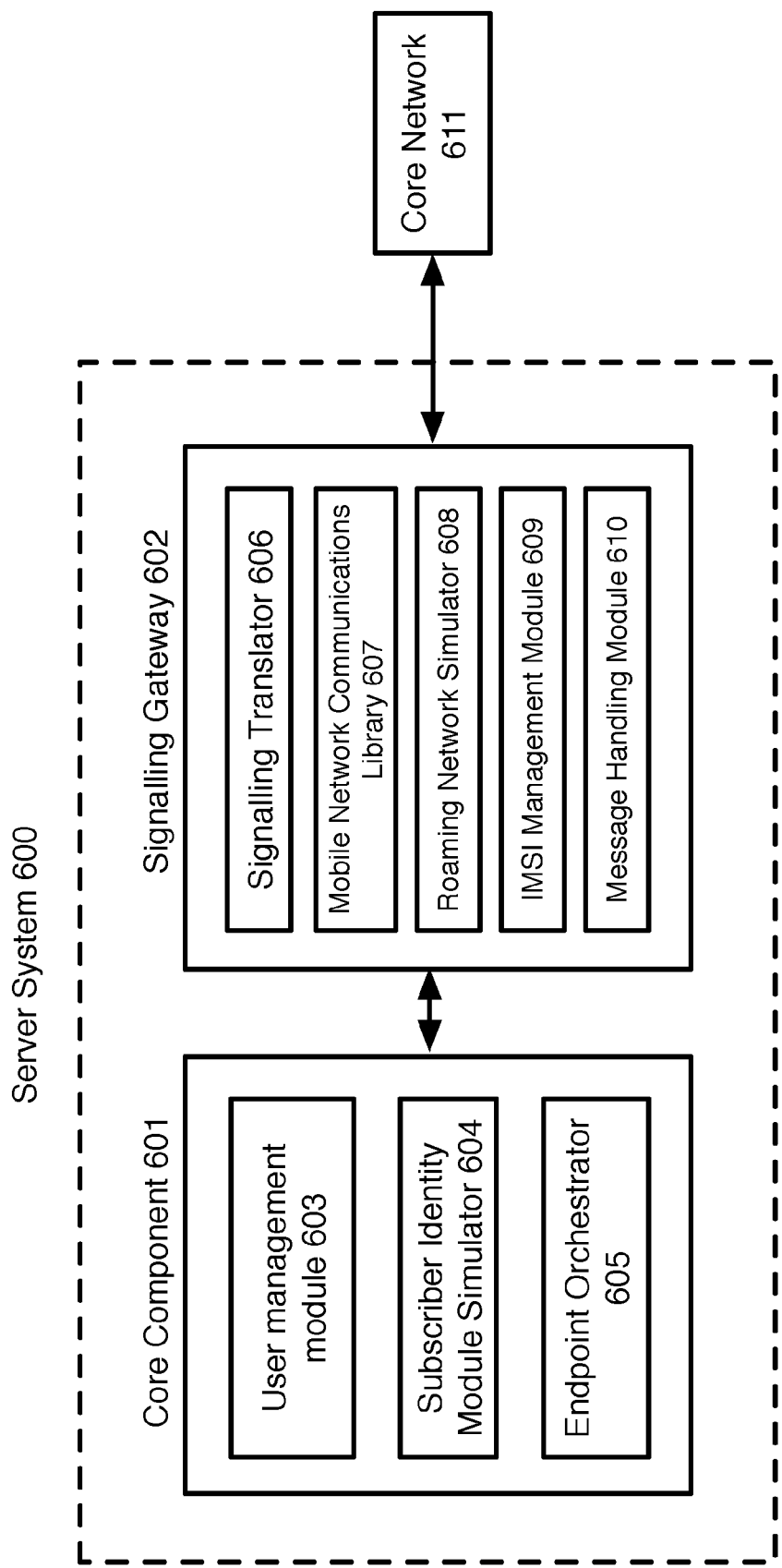
FIG. 6: shows a block diagram illustrating a server system in accordance with an embodiment of the invention.

In FIG. 6, a server system 600 in accordance with an embodiment of the invention will be described.

The server system 600 may comprise a core component 601 and a signalling gateway 602.

The core component 601 may include any of a user management module 603, a subscriber identity module simulator 604 and an endpoint orchestrator 605. All or some of the user management module 603, subscriber identity module simulator 604, and endpoint orchestrator 605 may together, or in part, simulate the subscriber identity module by performing actions in response to messages received.

The user management module 603 may be configured to register new users, associate users with IMSIs, store user authentication information and other user account administration tasks such as change passwords, delete user, update user information, billing and/or replenishment of airtime.

The subscriber identity module simulator 604 may be configured to simulate, at least in part, a subscriber identity module by storing and updating the state for the subscriber identity module, and may perform actions in relation to messages received.

A subscriber identity module simulator 604 may be executing for each simulated subscriber identity module. Each simulator may be executing concurrently in a separate process.

The end-point orchestrator 605 may be configured to register endpoints for the actions. Endpoints are destinations for the messages. Messages, such as messages from the registered handlers, may be directed towards the endpoints by the core component 601. The endpoints may perform actions in relation to the messages. The actions may include routing messages back through the signalling gateway to a core network, sending messages to the subscriber identity module simulator 604 and/or user management module 603, sending messages or routing messages via an externally exposed API, and processing the messages received. By way of example, an endpoint may translate a received SMS from one language to another before and then send the translated SMS to an IMSI.

Endpoints may expose an API via a remote procedure calls (RPC) (e.g. via a RESTful web service).

The core component 601 may be implemented using within an architecture with the ability to manage execution of millions of concurrent processes to enable the server system to support millions of simulated subscriber identity modules. The architecture may be written in the Erlang programming language. It will be appreciated that other architectures may provide similar advantages and may be used, that less-efficient architectures may also be used, and that other programming languages may be used to implement the architecture.

The signalling gateway 602 may include any of a signalling translator 606, a mobile network communications library 607, a roaming network simulator 608, an IMSI management module 609, and the message handling module 610.

Different core networks (e.g. 611) may implement different versions or methods of telecommunications protocols. The mobile network communications library 607 may include these telecommunications protocols for each of a plurality of core networks. The signalling translator 606 may be configured to utilise the mobile network communication library 607 telecommunications protocols to translate telecommunications messages to-and-from a particular core network (e.g. 611).

An example of the translator 606 being used to register an IMSI will be later described in relation to FIG. 7.

The roaming network simulator 608 may include a visitor location register (VLR) simulator and a mobile station centre (MSC) simulator (e.g. for a GSM system).

The IMSI management module 609 may be configured to activate or deactivate IMSIs, to add or delete IMSIs, and to store authentication credentials for the telecommunications network (e.g. authentication triplets for GSM). To remain current within a telecommunications network, IMSIs must be regularly registered with a core network (e.g. 611). As a part of activation, the IMSI management module manages regular registration of IMSIs.

The message handling module 610 may be configured to register handlers for the translated telecommunications messages. The handlers may then route translated messages from the core networks (e.g. 611) to the core component (e.g. at 601) for processing.

Figure 7:
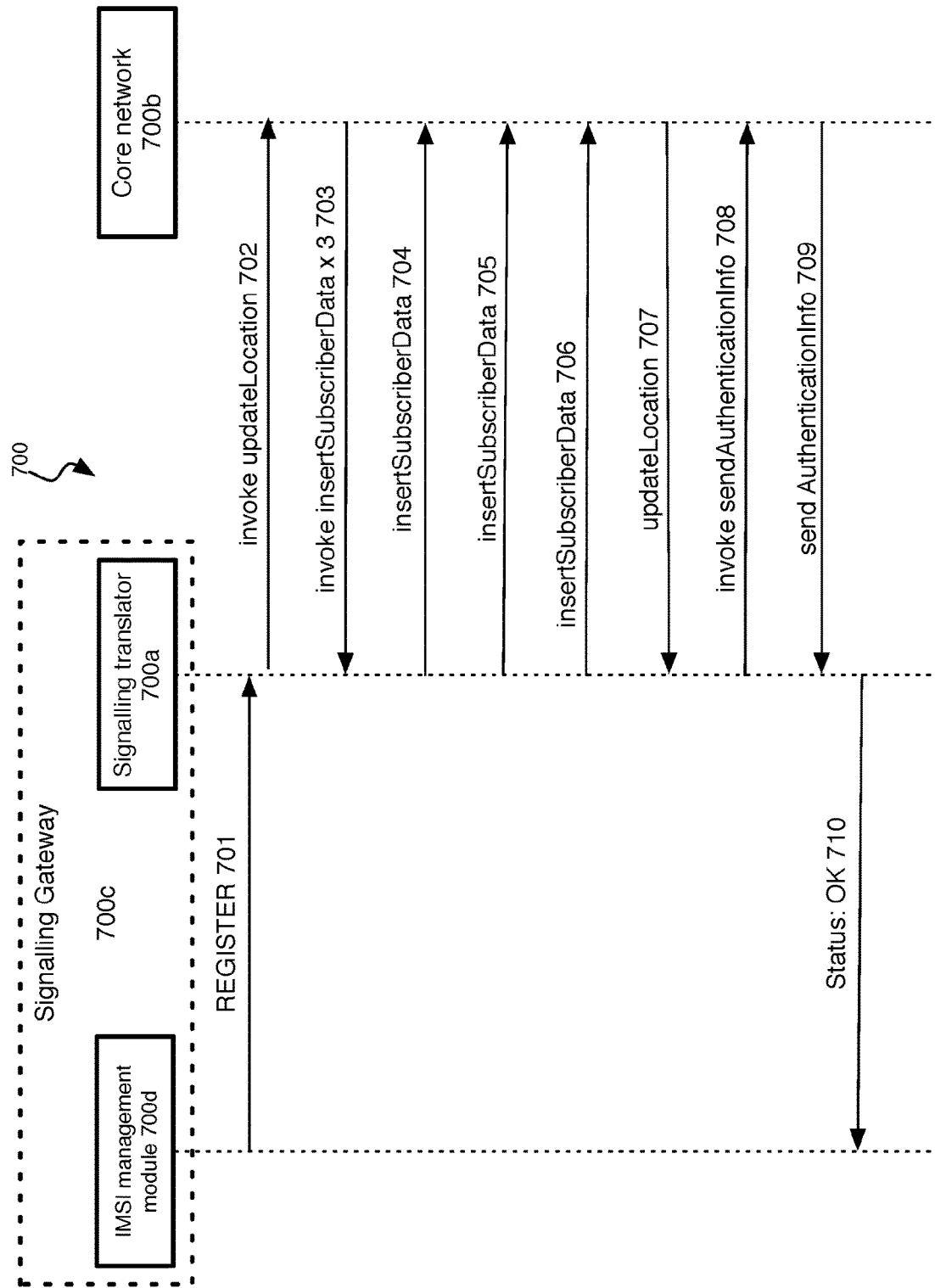
FIG. 7: shows a sequence diagram illustrating a translation of telecommunications messages between the signalling gateway and a core network in accordance with an embodiment of the invention.

FIG. 7 provides a sequence diagram 700 which illustrates translations made by a signalling translator 700*a* to-and-from a core network 700*b* in accordance with an embodiment of the invention such as described in relation to FIG. 6.

It will be appreciated that different core networks will utilise different protocols and that these translations are exemplary only. Furthermore, it will be appreciated that similar translations may be made for other standard telecommunications messages.

In this example, the signalling gateway 700*c* is registering an IMSI at its visitor location register with a core network 700*b* in GSM (registration occurs regularly to confirm to the core network 700*b* that an IMSI remains within the VLR). The MAP telecommunications protocol is used to communicate with the core network.

The signalling exchange including between the IMSI management module 700*d* and signalling translator 700*a* within the signalling gateway 700*c* and between the signalling gateway 700*c* and the core network 700*b* occurs as follows:

| Step | Time | Source | Destination | Protocol | Length |
|---|---|---|---|---|---|
| 701 | 20.577907 | 10.0.3.3 | 10.0.3.2 | SIP | 578 |
| Request: REGISTER sip:10.0.3.2:5060 (1 binding) | | | | | |
| 702 | 20.579920 | 2150 | 2001 | GSM MAP | 212 |
| invoke updateLocation | | | | | |
| 703 | 20.585824 | 2001 | 2150 | GSM MAP | 732 |
| SACK invoke insertSubscriberData invoke insertSubscriberData invoke insertSubscriberData | | | | | |
| 704 | 20.587353 | 2150 | 2001 | GSM MAP | 176 |
| SACK returnResultLast insertSubscriberData | | | | | |
| 705 | 20.587420 | 2150 | 2001 | GSM MAP | 160 |
| returnResultLast insertSubscriberData | | | | | |
| 706 | 20.587782 | 2150 | 2001 | GSM MAP | 160 |
| returnResultLast insertSubscriberData | | | | | |
| 707 | 20.595598 | 2001 | 2150 | GSM MAP | 184 |
| SACK returnResultLast updateLocation | | | | | |
| 708 | 20.596744 | 2150 | 2001 | GSM MAP | 208 |
| SACK invoke sendAuthenticationInfo | | | | | |
| 709 | 20.605639 | 2001 | 2150 | GSM MAP | 304 |
| SACK returnResultLast sendAuthenticationInfo | | | | | |
| 710 | 20.606652 | 10.0.3.2 | 10.0.3.3 | SIP | 680 |
| Status: 200 OK (1 binding) | | | | | |

10.0.3.3 represents the address for the IMSI management module 700*d* within the signalling gateway 700*c* inside the server system.

10.0.3.2 represents the address for translator module 700*a* within the signalling gateway 700*c* inside the server system.

2150 represents the address for the server system using SS7 addressing. The translator module 700*a* receives and transmits messages via that address.

2001 represents the address for a core network 700*b* using SS7 addressing.

SIP, GSM MAP, and SCTP represent the communications protocols used for each message.

In step 701, the translator module 700*a* receives instructions to register three subscriber data (e.g. IMSIs).

In step 702, the translator module 700*a* transmits an updateLocation MAP message to the core network 700*b*.

In step 703, the core network 700*b* acknowledges the request and send requests to insert three subscriber data in the visitor location register at the server system.

In steps 704, 705 and 706, the translator module 700*a* acknowledges the subscriber data and confirms its entry.

In step 707, the core network 700*b* acknowledges the confirmation and confirms that updatelocation is concluded.

In step 708, the translator module 700*a* acknowledges the confirmation and transmits a sendAuthenticatiionInfo MAP message to the core network 700*b*.

In step 709, the core network 700*b* returns with authentication information for the three IMSIs.

In step 710, the IMSI and authentication information is transmitted from the translator module 700*a* to the IMSI management module 700*d*.

Figure 8:
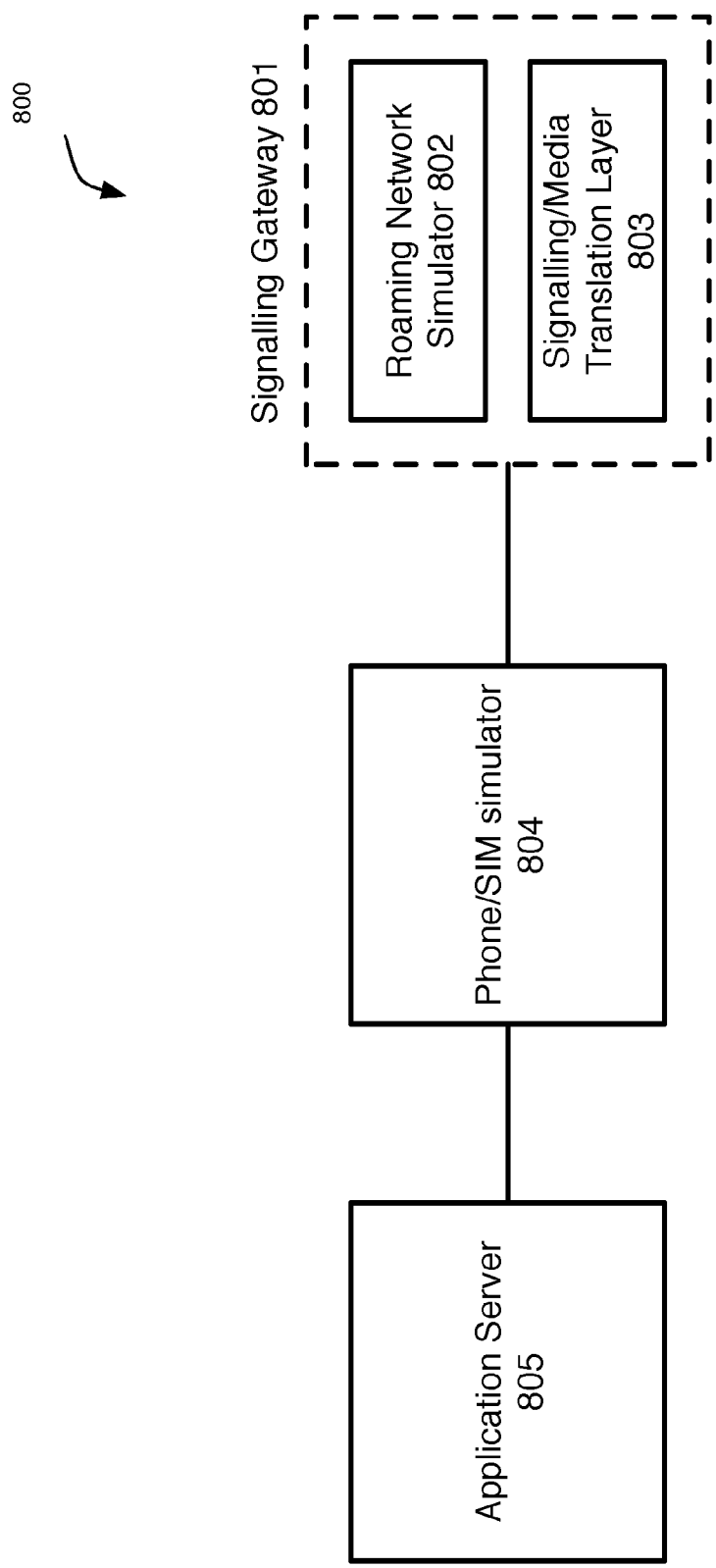
FIG. 8: shows a block diagram illustrating a server system in accordance with an embodiment of the invention.

A method and system 800 for routing communications within a telecommunications network in accordance with embodiments of the invention will now be described with reference to FIG. 8.

These embodiments provides for the virtualization of the functions (registration, deregistration, authentication, making and receiving of calls, SMS, MMS, UDP, internet browsing etc) of a mobile station (MS—more commonly known as a phone) including the inserted SIM on an mobile operators network via the use of IMSI information plus a roaming setup with a mobile network operator (MNO) that owns the SIM. One embodiment may also allow the augmentation of functionality of a phone in a programmatic fashion.

In essence, it may makes it appear to the operator as though a subscriber is using a real phone on the operator's Mobile Operators Network when in actual fact, there may not be a phone or even a physical SIM but instead software that is simulating the behaviour of such a phone/SIM. That is, a virtual phone or virtual SIM.

This may provide one or more advantages ranging from an ability to arbitrarily juxtapose the virtual phone functions onto a real phone or onto a piece of software, or to implement new programmatic control of such a virtual phone e.g. when the phone is to ring, make an LED light up. It may also mean that, unlike a real phone which is limited to its current hardware and software stack, a "virtualized" phone can be augmented with new functionalities not constrained to phone hardware such as translation mechanisms to translate a conversation in real time, or machine learning algorithms to scan audio/text in real time to identify fight spam or marketing callers.

The system 800 of these embodiments may include three components:
1. A signalling gateway 801 including:
   A Roaming Network simulator 802 for peering with an existing MNO. Roaming Networks allow an MNO subscriber to use the Roaming Network while maintaining consistency of billing information, registration, authentication, etc, functions.
   A signalling and media translation layer 803 providing a lower layer signalling protocol to permit the Roaming Network simulation to interface with the peer MNO network (whose SIMs are used). It implements SS7 based protocols over TDM or Sigtran and exposes MAP, TCAP in accordance with whatever the MNO support for the Roaming Network to function (it will be appreciated that other protocols may be supported instead or additional, such as Diameter).
2. A phone/SIM simulator 804 which simulates the messaging flows and state that a real phone/SIM would trigger had it been physically present on a real Roaming Network. The simulator may be implemented wholly, or in part, in software.
3. An application server 805 that exposes events and APIs that integrate with the simulation layer so third parties can build value added applications that exploit such a platform.

In some embodiments, the system 800 may also stop virtualizing a phone/SIM when the physical SIM is in use on an actual network (in addition, transparent switching back to a physical phone may be provided for when the physical phone SIM is activated).

The components 801, 804, and 805 described above may be all software components which may execute on commodity servers and may be on the same server or housed across different servers and networked together using IP protocols. Multiple instances of the components 801, 804 and 805 may be executing on the same server or different servers to facilitate scaling of the system. It will be appreciated that some or all of the component 801, 804, and 805 may also be implemented within hardware.

The signalling gateway 801 may provide the main interface with the Mobile Network Operator and, depending on the Mobile Network Operator setup and what their network supports, can be connected via standard IP protocols like Sigtran or may required custom hardware containing a SS7 card.

The signalling gateway 801 is responsible for setting up the link (physical and logical), and transmitting information in a compatible format, between itself and the MNO Home Network to which a SIM belongs.

The Roaming Network simulator 802 provides the Network logical entities required by the MNO Home Network to recognize this network as a peer roaming network on which its SIMs are allowed to be used (so, for example, for GSM the Roaming Network simulator 802 would publish a VLR (Visitor Location Register) and MSC (Mobile Switching Centre) which an MNO Home Network would recognize). It may also implement a Media Gateway and endpoints for a Data Network such as a GGSN and the SSGN.

The phone/SIM simulator 804 may simulate a physical phone containing a SIM card. The simulator 804 may be supplied with a SIM card identifier (e.g an IMSI) and use this information to alert the home MNO network for that subscriber via a series of specific and well defined messages (sent via the Signalling Gateway) that can be customized for the configuration and type of MNO network to notify the MNO Network that its SIM (hence subscriber) is now roaming on this network (for GSM networks, this is called a location update).

The phone/SIM simulator 804 is also responsible for notifying the Roaming Network simulator 802 to ensure it forwards all relevant requests to network to this layer for processing. So for example if an inbound call happens and the MNO Network notifies the Roaming Network simulator 802. The Roaming Network simulator 802 uses the configuration to notify the phone/SIM simulator 804 that the phone is 'ringing'. The phone/SIM simulator 804 can then choose to 'Pick up the phone' and notifies the Roaming Network simulator 802 which triggers the exchange of messages and audio data as well as ensuring billing consistency. The same applies to making a call. The phone/SIM simulator 804 supplies the phone number to call to the Roaming Network simulator 802 and it does the relevant transactions via the Signalling Layer 803 to establish the call. These functions may duplicate each and every function an actual phone attached to MNO Network Operators would have done.

The phone/SIM simulator 804 may provide APIs and also publish events that the application server 805 could use to build completely new applications that use this functionality.

The application server 805 is the main interface and the central point for allowing access to this architecture for third parties to build augmented services on top of this. For example, the application server 805 could be programmed when a phone 'rings' to ring another device and redirect the audio from the phone/SIM simulator 804 to that device, or if it receives an SMS from the phone layer—to send the SMS to a configured email(s) and any emails received from a certain SMS be sent via the phone/SIM simulator 804 as an SMS sent as that user. Another example may be to automatically check the phone balance and top-up the phone when the balance drops The system 800 may also be used to route communications onward from the simulated subscriber identity module (e.g. the phone/SIM simulator 804).

Figure 9:
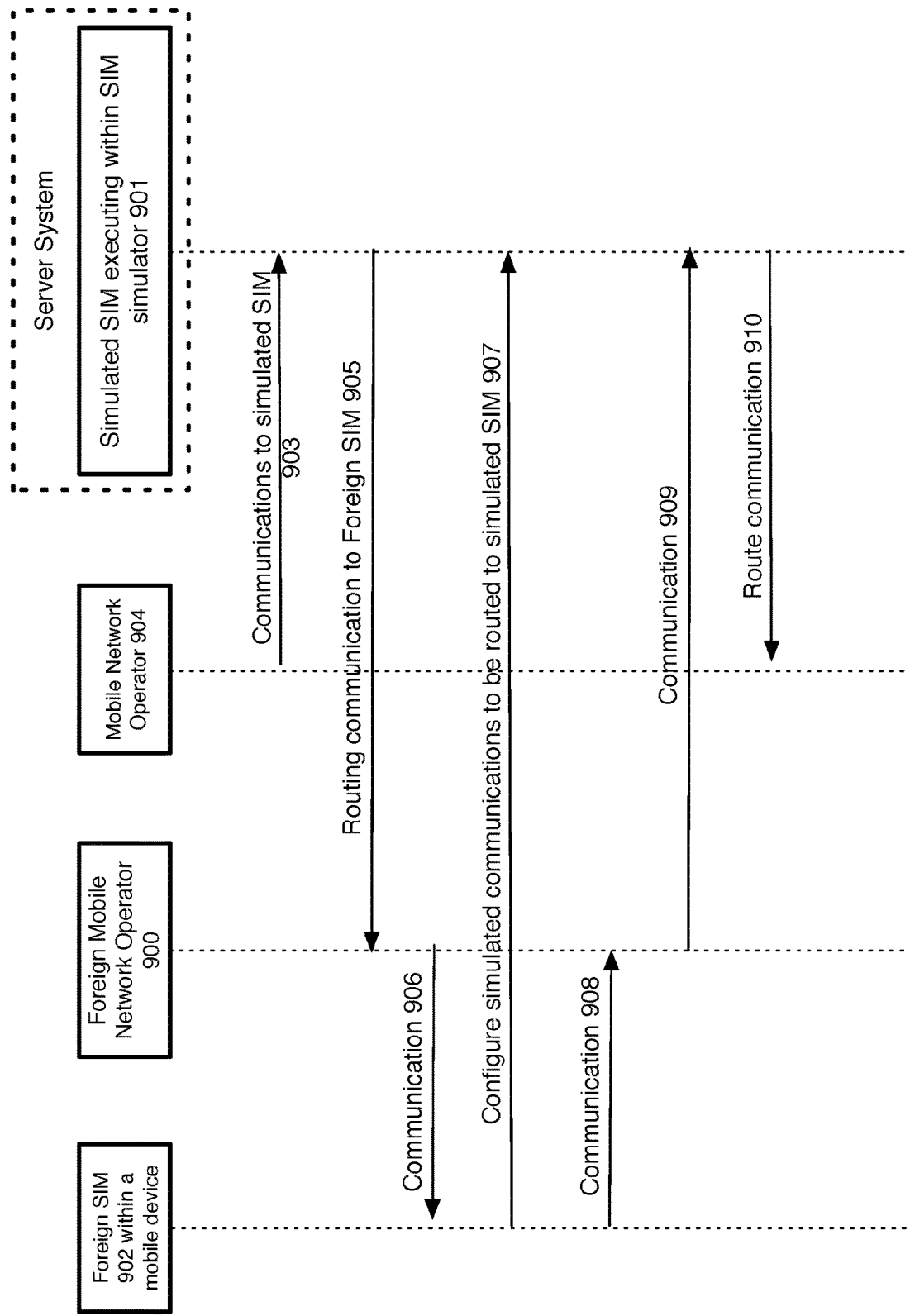
FIG. 9: shows a sequence diagram illustrating a method for routing communications within a telecommunications network in accordance with an embodiment of the invention.

One example of routing will be described with reference to FIG. 9. In this example, a foreign/overseas mobile network 900 may have its own SIM cards. Under this scenario the SIM simulator 901 could execute software that routes communications (VOICE, SMS, USSD) to and from the simulated SIM to a device 902 on a foreign network 900 (e.g. communications 903 via mobile network operator 904 might be routed in 905 via foreign network 900 to in 906 device with foreign SIM 902).

Under this scenario, a user of a simulated SIM when travelling could utilize a foreign SIM on a Foreign Network and via an Administration app on the phone (or IVR (Interactive Voice Response) commands) request in 907 that his SIMULATED communications in 908 be redirected in 909 to his simulated SIM (which may be routed onward, for example, in 910). He would also have special instructions or an app that could help him initiate communications from this device with a foreign SIM 902 to use his simulated SIM.

This may be advantageous because:
1) Previously an operator that wanted to allow the use of their services in foreign radio networks would need explicit agreements with a foreign radio network. This allows a user to use a local SIM in that network to effectively roam while also being a local subscriber;
2) The operator can now independently determine the rates he will charge. This previously used to be coupled to the roaming agreement an operator used to have; and
3) This method with an app on the device allows the exposure of the full range of simulated SIM services like USSD for mobile money transfers—this is very difficult to achieve with traditional roaming arrangements (e.g. USSD is usually not supported).

Figure 10:
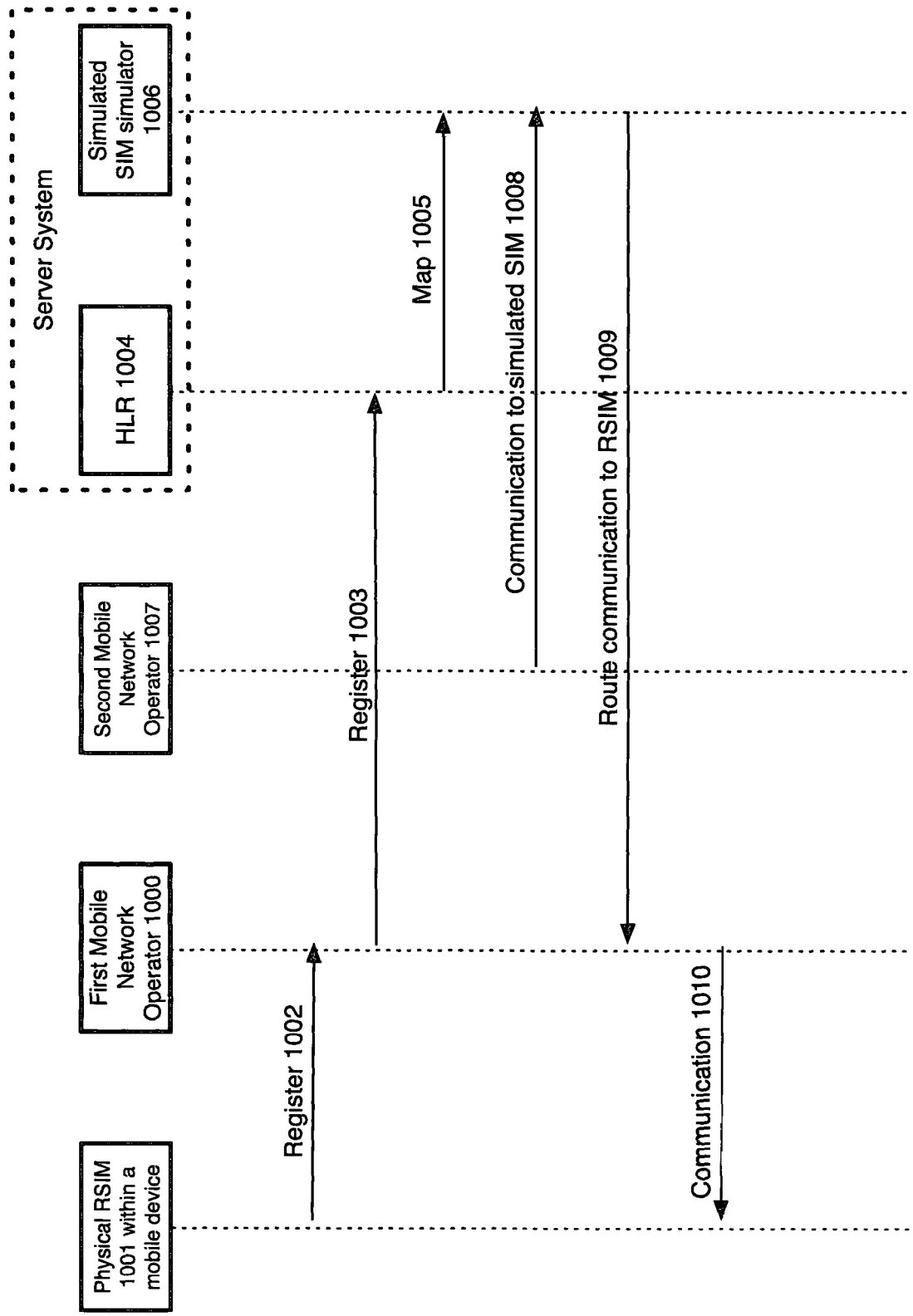
FIG. 10: shows a sequence diagram illustrating a method for routing communications within a telecommunications network in accordance with an embodiment of the invention.

A further example will be described with reference to FIG. 10. In this example, (which may be a specialised application of the preceding example), the foreign network may be instead the Physical Network 1000 of the MNO (Mobile Network Operator) and the SIM 1001 being used on that radio network is a SIM associated with the Simulated Roaming Network (RSIM) i.e. the RSIMs home network is the simulated SIM network.

In this situation when the RSIM 1001 joins 1002 the MNO network 1000—it sends a message 1003 to the Simulated Network (via a simulated or actual HLR 1004) to alert it that its subscriber has joined the network. Under this situation, an app could map 1005 the RSIM 1001 to one or more SIMULATED sims executing on the SIM simulator 1006 (each of the SIMULATED sims may belong to MNO 1000 or MNO 1007). This effectively allows the MNO to provision its own users (and possibly multiple users to the same RSIM) but exploit the advanced architecture and facilities of a SIMULATED network without upgrading its own core Network. For example, if a communication was received from a second mobile network operator 1007 for the simulated SIM in 1008, it could be routed via 1009 and 1010 to the device with the RSIM 1001.

This may be advantageous because:
1) The MNO 1000 does not have the burden of issuing physical SIMs which is quite intensive;
2) If the SIMULATED network was serving multiple telcos—it would mean a user could port numbers without switching SIMs; and
3) It could indeed mean the user could have multiple sets of numbers provisioned on the same SIM (a functionality that can presently only be accomplished with specialised SIM cards called Multi IMSI SIM cards).

Figure 11:
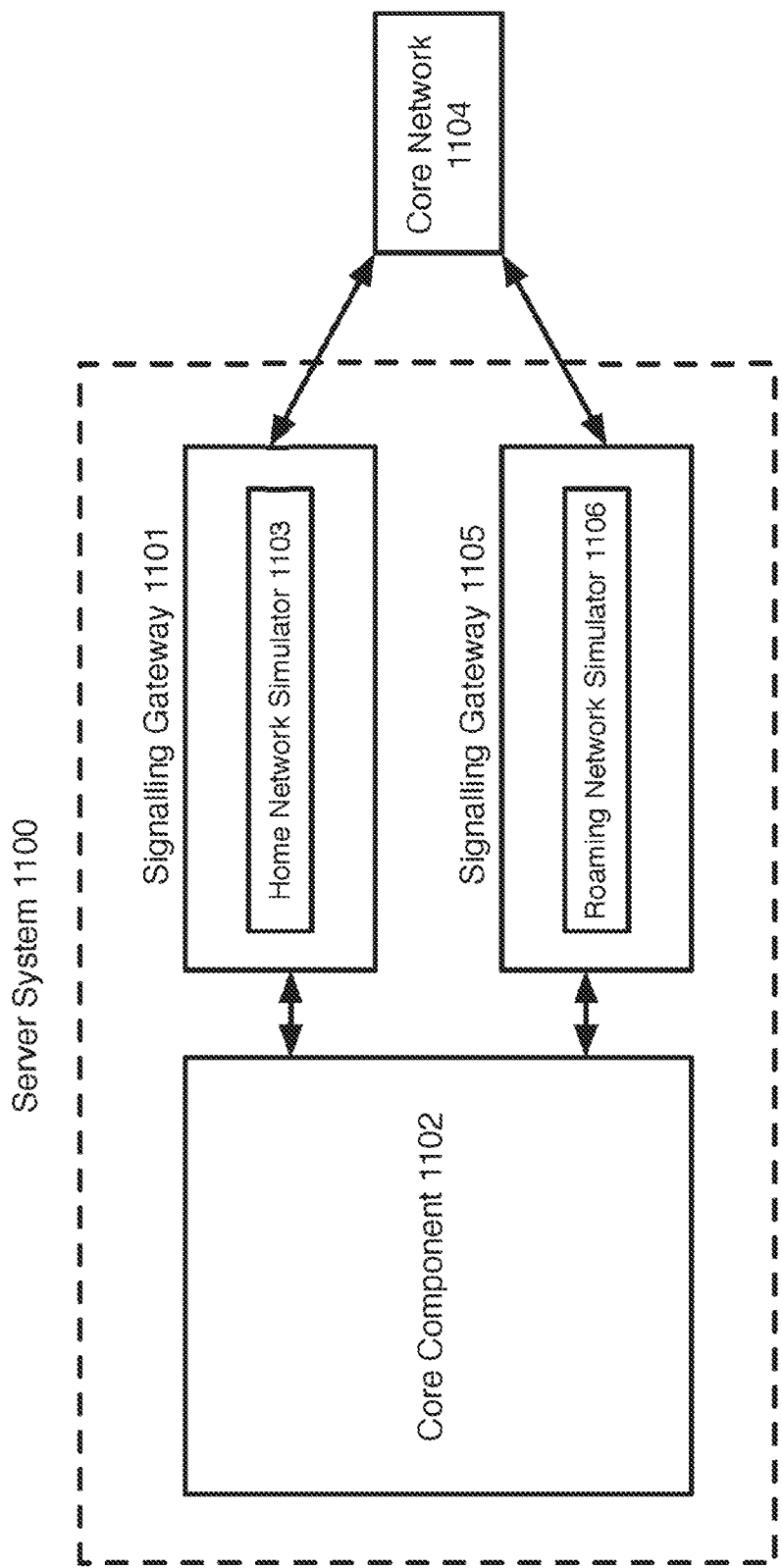
FIG. 11: shows a block diagram illustrating a system for routing communications within a telecommunications network in accordance with embodiments of the invention.
Figure 12:
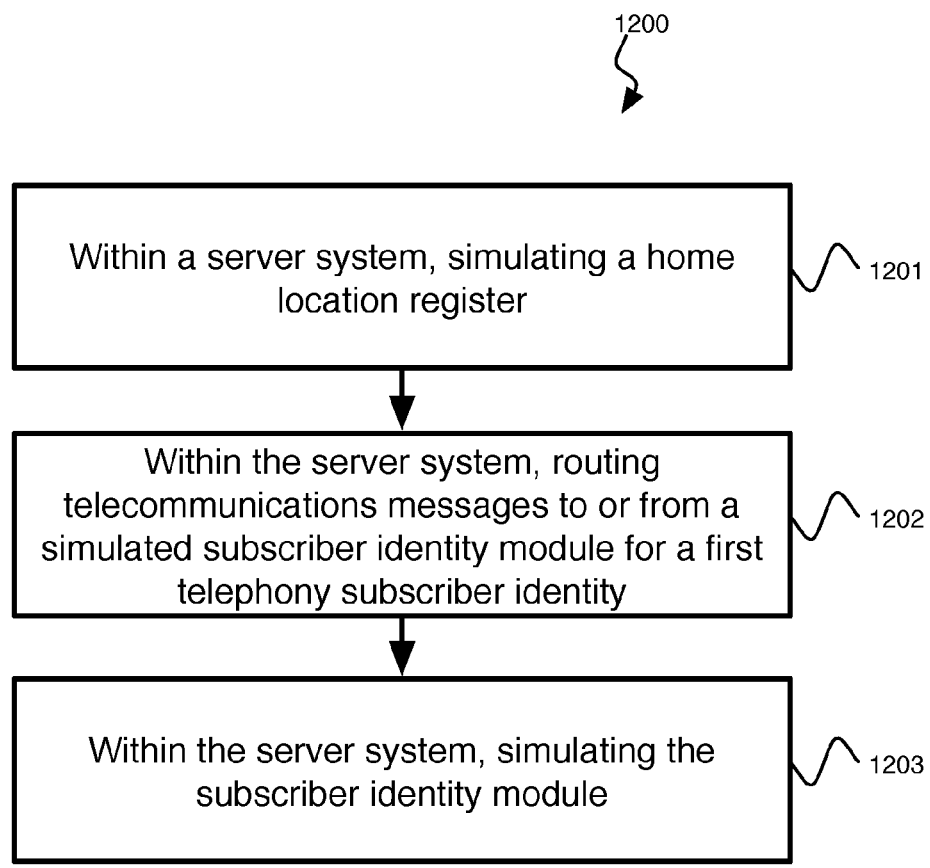
FIG. 12: shows a flow diagram illustrating a method for routing communications within a telecommunications network in accordance with embodiments of the invention.

Referring to FIGS. 11 and 12, a server system 1100 and method 1200 for routing communications within a telecommunications network will be described.

A server system 1100 is shown. The server system 1100 includes a first signalling gateway 1101 and a core component 1102.

The first signalling gateway is configured for simulating a home network (via a home network simulator 1103, for example, by simulating, at least, a home location register (HLR)) to one or more core networks 1104 (e.g. via SS7) in step 1201, and for routing messages in step 1202 for a first telephony subscriber identity to a simulated subscriber identity module and/or for routing messages from the simulated subscriber identity module for the first telephony subscriber identity to a third telephony subscriber identity.

The core component 1102 may be configured for simulating the simulated subscriber identity module in step 1203, receiving messages to the simulated subscriber identity module and/or performing an action at the simulated subscriber identity module.

The server system 1100 may include a second signalling gateway 1105.

The second signalling gateway 1105 may be configured for simulating a roaming network (via a roaming network simulator 1106, for example, by simulating, at least, a visitor location register (VLR)) and for routing messages for a second telephony subscriber identity to the simulated subscriber identity module and/or for routing messages from the simulated subscriber identity module for the second telephony subscriber identity to a third or fourth telephony subscriber identity.

The first, second, third and/or fourth telephony subscriber identities may be associated with the same subscriber.

The server system 1100 may be deployed on one or more processors and one or more communications apparatuses.

Potential advantages of some embodiments of the present invention include: additional functionality can be provided with a telecommunications network and the functionality can be provided easily without modifying standard telecommunications protocols, subscriber identity modules can be simulated obviating the need for physical hardware, third party access and/or functionality relating to a user's handset can be provided easily and/or securely, and telecommunications services such as calls and SMS messages can be re-routed between IMSIs.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A method for routing communications within a telecommunications network, including:
within a server system:
executing a simulated subscriber identity module associated with a first telephony subscriber identity within a simulator in the server system;
executing a signaling gateway;
routing a telecommunications message received at the server system from a core network via the signaling gateway for a mobile network operator for the first telephony subscriber identity to the simulated subscriber identity module associated with the first telephony subscriber identity executed within the simulator in the server system; and performing messaging routing in relation to the telecommunications message at the simulated subscriber identity module executed within the simulator in the server system, wherein the first telephony subscriber identity is a unique identifier within the telecommunications network, the server system includes a roaming network or simulates, at least in part, the roaming network, the simulated subscriber identity module simulates telecommunications messaging flows within the simulator in the server system, and wherein the server system interconnects with the core network via a signaling interface provided by the signaling gateway, wherein the first telephony subscriber identity is one or more of an International Mobile Subscriber Identity (IMSI), Mobile Station-Integrated Services Digital Network (MS-ISDN), Globally Unique Temporary Identifier (GUTI), IP Multimedia Private Identity (IMPI), IP multimedia public identity (IMPU), or Globally Routable User Agent Uniform Resource Identifier (GRUU), and wherein the roaming network includes one or more of a Visitor Location Register (VLR), a Mobile Switching Centre (MSC), a Mobility Management Entity (MME), or a Call Session Control Function (CSCF).

2. The method as claimed in claim 1, wherein the first telephony subscriber identity is the IMSI, the roaming network includes the VLR, and the IMSI is used to register at the VLR.

3. The method as claimed in claim 1, wherein the telecommunications message is a GSM, UMTS, LTE, or VoLTE message.

4. The method as claimed in claim 1, wherein the signaling interface receives the telecommunications message via SS7.

5. The method as claimed in claim 1, wherein the simulated subscriber identity module stores a state for the simulated subscriber identity module.

6. The method as claimed in claim 1, further including providing an application programming interface (API) for access to the simulated subscriber identity module, and wherein the API is exposed via Internet Protocol (IP).

7. The method as claimed in claim 1, wherein the telecommunications message is routed to the simulated subscriber identity module when a physical subscriber identity module associated with the first telephony subscriber identity is not detected within the telecommunications network.

8. The method as claimed in claim 1, wherein the telecommunications message is routed to the simulated subscriber identity module based on a configuration message being received by the server system from a user of the first telephony subscriber identity.

9. The method as claimed in claim 1, further including routing a second telecommunications message to a physical subscriber identity module when the physical subscriber identity module associated with the first telephony subscriber identity is detected within the telecommunications network.

10. The method as claimed in claim 1, wherein the messaging routing includes routing of communications routed to the first telephony subscriber identity to a second telephony subscriber identity.

11. The method as claimed in claim 10, wherein the second telephone subscriber identity has a home network and the home network is the roaming network included within the server system.

12. The method as claimed in claim 1, wherein the telecommunications message is routed to the first telephony subscriber identity from a third telephony subscriber identity associated with a physical subscriber identity module.

13. The method as claimed in claim 12, wherein the third telephone subscriber identity has a home network and the home network is the roaming network included within the server system.

14. The method as claimed in claim 1, wherein the telecommunications message is a GSM, UMTS, LTE, or VoLTE message, the signaling interface receives the telecommunications message via SS7, the simulated subscriber identity module stores a state for the simulated subscriber identity module, and the telecommunications message is routed to the simulated subscriber identity module when a physical subscriber identity module associated with the first telephony subscriber identity is not detected within the telecommunications network.

15. The method as claimed in claim 1, wherein the messaging routing includes routing of communications routed to the first telephony subscriber identity to a second telephony subscriber identity, and the telecommunications message is routed to the first telephony subscriber identity from a third telephony subscriber identity associated with a physical subscriber identity module.

16. The method as claimed in claim 1, wherein the signaling gateway is configured to simulate telecommunications messaging flows within the server system and transform the message received at the server system before the message is routed to the simulated subscriber identity module.

17. The method as claimed in claim 1, wherein the telecommunications message is routed to the simulated subscriber identity module based on a physical subscriber identity module associated with the first telephony subscriber identity not being detected within the telecommunications network and a second telecommunications message is routed to the physical subscriber identity module based on the physical subscriber identity module associated with the first telephony subscriber identity being detected within the telecommunications network.

18. The method as claimed in claim 1, wherein the simulator in the server system simulates the messaging flows and a state that a real SIM would trigger had it been physically present on a real roaming network.

19. The method as claimed in claim 1, wherein the simulator in the server system simulates, at least in part, a phone utilizing the simulated subscriber identity module.

20. The method as claimed in claim 1, wherein the core network transmits, at least some, telecommunications messages to the simulated subscriber identity module as an end-point of the core network.

21. The method as claimed in claim 1, wherein the simulator simulates the simulated subscriber identity module as roaming on the core network.

22. The method as claimed in claim 1, wherein the signaling gateway acts as a roaming gateway connecting the server system and the core network.

23. The method as claimed in claim 1, wherein:
the telecommunications message is a GSM, UMTS, LTE, or VoLTE message;
the signaling interface receives the telecommunications message via SS7;

the simulated subscriber identity module stores a state for the simulated subscriber identity module; and the telecommunications message is routed to the simulated subscriber identity module when a physical subscriber identity module associated with the first telephony subscriber identity is not detected within the telecommunications network.

24. The method as claimed in claim 1, wherein the simulated subscriber identity module within the simulator in the server system is treated as an end-point by the core network.

25. A server system for routing communications within a telecommunications network, the server system comprising communication circuitry and one or more processors coupled to the communication circuitry and configured to:
execute, within the server system, a simulated subscriber identity module associated with a first telephony subscriber identity within a simulator in the server system;
execute, within the server system, a signaling gateway;
route a telecommunications message received at the server system from a core network via the signaling gateway for a mobile network operator for the first telephony subscriber identity to the simulated subscriber identity module associated with the first telephony subscriber identity executed within the simulator in the server system; and
perform messaging routing in relation to the telecommunications message at the simulated subscriber identity module executed within the simulator in the server system,
wherein the first telephony subscriber identity is a unique identifier within the telecommunications network, the server system includes a roaming network or simulates, at least in part, the roaming network, the simulated subscriber identity module simulates telecommunications messaging flows within the simulator in the server system, and wherein the server system interconnects with the core network via a signaling interface provided by the signaling gateway,
wherein the first telephony subscriber identity is one or more of an International Mobile Subscriber Identity (IMSI), Mobile Station-Integrated Services Digital Network (MS-ISDN), Globally Unique Temporary Identifier (GUTI), IP Multimedia Private Identity (IMPI), IP multimedia public identity (IMPU), or Globally Routable User Agent Uniform Resource Identifier (GRUU), and wherein the roaming network includes one or more of a Visitor Location Register (VLR), a Mobile Switching Centre (MSC), a Mobility Management Entity (MME), or a Call Session Control Function (CSCF).

26. Electronically readable non-transitory storage medium having stored therein instructions to be executed on at least one processor of a server system for routing communications within a telecommunications network, the instructions when executed causing the server system to:
execute, within the server system, a simulated subscriber identity module associated with a first telephony subscriber identity within a simulator in the server system;
execute, within the server system, a signaling gateway;
route a telecommunications message received at the server system from a core network via the signaling gateway for a mobile network operator for the first telephony subscriber identity to the simulated subscriber identity module associated with the first telephony subscriber identity executed within the simulator in the server system; and
perform messaging routing in relation to the telecommunications message at the simulated subscriber identity module executed within the simulator in the server system,
wherein the first telephony subscriber identity is a unique identifier within the telecommunications network, the server system includes a roaming network or simulates, at least in part, the roaming network, the simulated subscriber identity module simulates telecommunications messaging flows within the simulator in the server system, and wherein the server system interconnects with the core network via a signaling interface provided by the signaling gateway,
wherein the first telephony subscriber identity is one or more of an International Mobile Subscriber Identity (IMSI), Mobile Station-Integrated Services Digital Network (MS-ISDN), Globally Unique Temporary Identifier (GUTI), IP Multimedia Private Identity (IMPI), IP multimedia public identity (IMPU), or Globally Routable User Agent Uniform Resource Identifier (GRUU), and wherein the roaming network includes one or more of a Visitor Location Register (VLR), a Mobile Switching Centre (MSC), a Mobility Management Entity (MME), or a Call Session Control Function (CSCF).

27. A mobile telephony device comprising a subscriber identity module, the mobile telephony device configured to receive or transmit via a Base Transceiver Station (BTS) a telecommunications message from or to a first telephony subscriber from or to a server system for routing communications within a telecommunications network, the server system comprising communication circuitry and one or more processors coupled to the communication circuitry and configured to:
execute, within the server system, a simulated subscriber identity module associated with a first telephony subscriber identity within a simulator in the server system;
execute, within the server system, a signaling gateway;
route the telecommunications message received at the server system from a core network via the signaling gateway for a mobile network operator for the first telephony subscriber identity to the simulated subscriber identity module associated with the first telephony subscriber identity executed within the simulator in the server system; and
perform messaging routing in relation to the telecommunications message at the simulated subscriber identity module executed within the simulator in the server system,
wherein the first telephony subscriber identity is a unique identifier within the telecommunications network, the server system includes a roaming network or simulates, at least in part, the roaming network, the simulated subscriber identity module simulates telecommunications messaging flows within the simulator in the server system, and wherein the server system interconnects with the core network via a signaling interface provided by the signaling gateway,
wherein the first telephony subscriber identity is one or more of an International Mobile Subscriber Identity (IMSI), Mobile Station-Integrated Services Digital Network (MS-ISDN), Globally Unique Temporary Identifier (GUTI), IP Multimedia Private Identity (IMPI), IP multimedia public identity (IMPU), or Globally Routable User Agent Uniform Resource Identifier (GRUU), and wherein the roaming network includes one or more of a Visitor Location Register (VLR), a Mobile Switching Centre (MSC), a Mobility Management Entity (MME), or a Call Session Control Function (CSCF).

28. A telecommunications network, including:
a plurality of mobile telephony devices;
a server system for routing communications within the telecommunications network; and
one or more core networks,
wherein the the server system comprises communication circuitry and one or more processors coupled to the communication circuitry and configured to:
   execute, within the server system, a simulated subscriber identity module associated with a first telephony subscriber identity within a simulator in the server system;
   execute, within the server system, a signaling gateway;
   route a telecommunications message received at the server system from the one or more core networks via the signaling gateway for a mobile network operator for the first telephony subscriber identity to the simulated subscriber identity module associated with the first telephony subscriber identity executed within the simulator in the server system; and
   perform messaging routing in relation to the telecommunications message at the simulated subscriber identity module executed within the simulator in the server system,
wherein the first telephony subscriber identity is a unique identifier within the telecommunications network, the server system includes a roaming network or simulates, at least in part, the roaming network, the simulated subscriber identity module simulates telecommunications messaging flows within the simulator in the server system, and wherein the server system interconnects with the one or more core networks via a signaling interface provided by the signaling gateway,
wherein the first telephony subscriber identity is one or more of an International Mobile Subscriber Identity (IMSI), Mobile Station-Integrated Services Digital Network (MS-ISDN), Globally Unique Temporary Identifier (GUTI), IP Multimedia Private Identity (IMPI), IP multimedia public identity (IMPU), or Globally Routable User Agent Uniform Resource Identifier (GRUU), and wherein the roaming network includes one or more of a Visitor Location Register (VLR), a Mobile Switching Centre (MSC), a Mobility Management Entity (MME), or a Call Session Control Function (CSCF).

\* \* \* \* \*